Patented Nov. 6, 1934

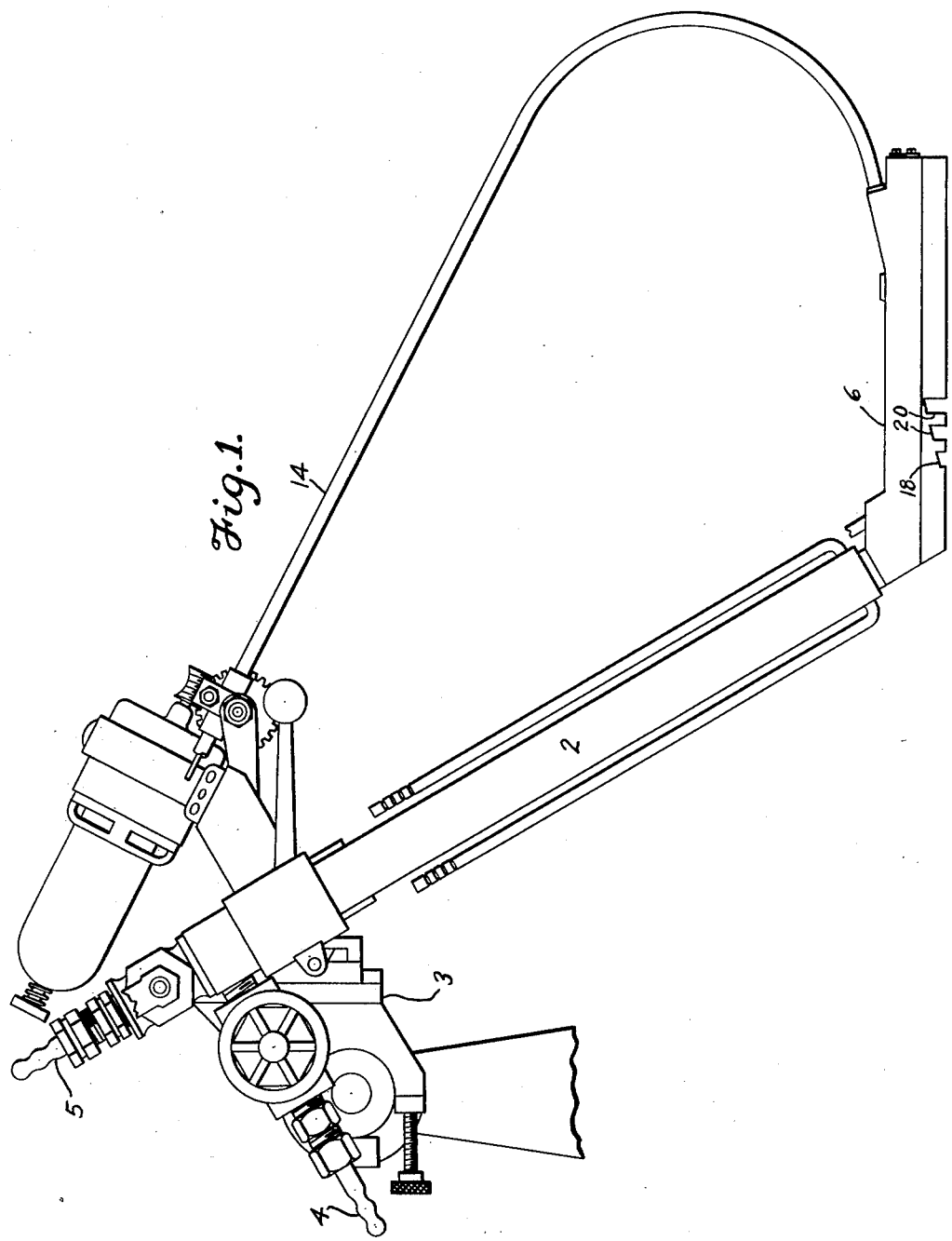

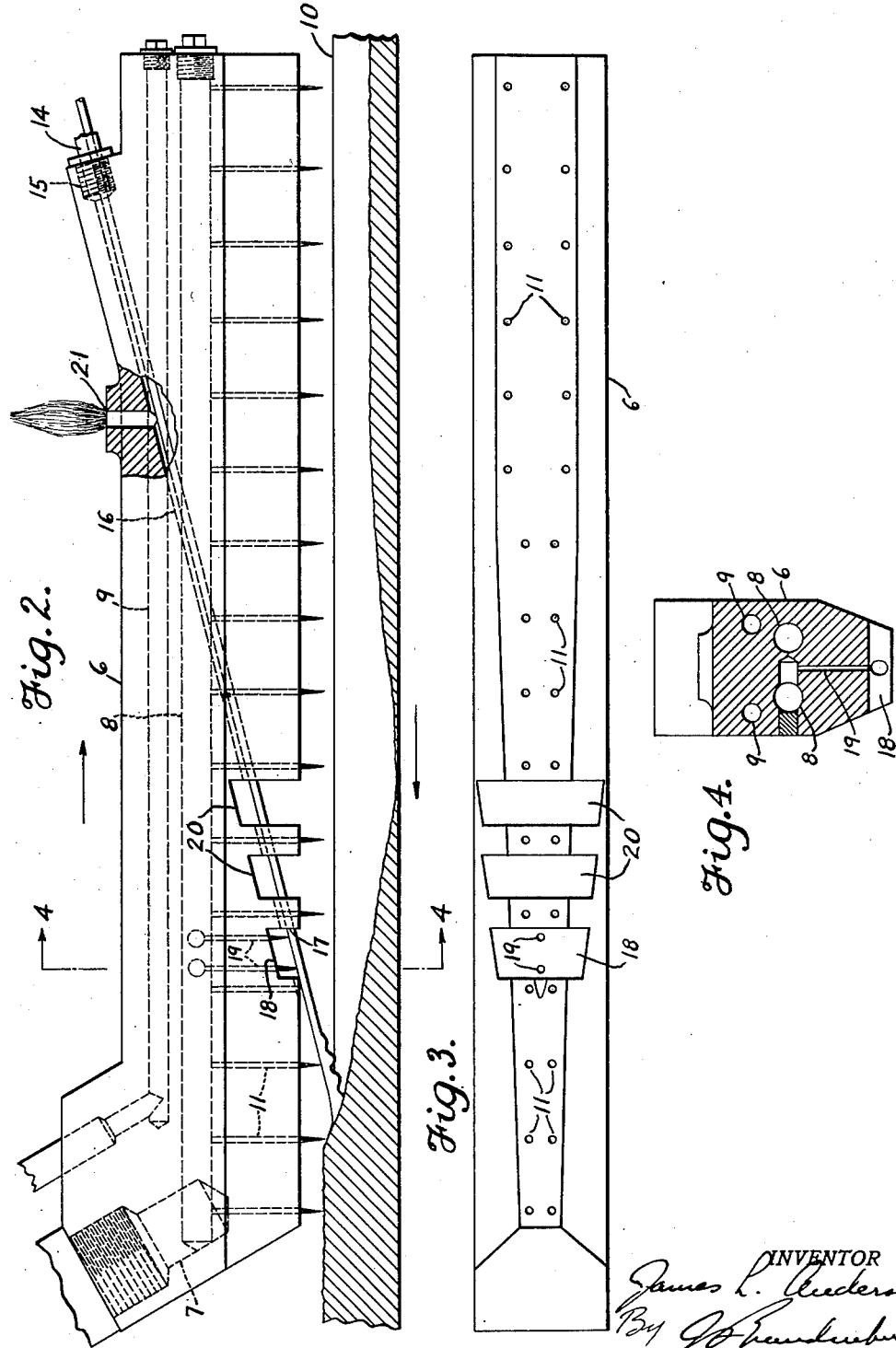

1,979,243

UNITED STATES PATENT OFFICE 1,979,243

APPARATUS AND METHOD FOR FUSION WELDING

James L. Anderson, Tenafly, N. J., assignor to Air Reduction Company, Incorporated, New York, N. Y., a corporation of New York Application October 5, 1929, Serial No. 397,541

14 Claims. (Cl. 113—59)

The invention relates to the art of progressive welding of seams between sheets, plates or the edges of open-seam pipe or tubing, by fusion produced by high temperature flame jets, and it is concerned with the art of machine welding as distinguished from hand welding. The invention relates, further, to that branch of the art in which a weld metal wire is mechanically fed and guided to the welding region.

In my prior Patent No. 1,438,285, dated Dec. 12, 1922, there is disclosed a welding torch having a tip block formed with numerous passages so as to deliver a double row, or equivalent seamwise-extended arrangement, of jets, among which passes a separate wire channel for conducting the weld metal wire to the lower face of the block intermediate the ends of the heating area.

In that patent the wire channel is shown either vertical or forwardly inclined. A limiting factor affecting the linear speeds of welding with such apparatus is the rate at which the wire can be fed and properly melted into the seam.

The object of this invention is to make possible much greater linear speeds of welding, also to make it possible to fill deep troughs between the beveled edges of thick material while driving the torch or the work at much greater speeds than would otherwise be permissible. Generally speaking, the purpose is to produce any desired depth or fullness of weld with the aid of added metal and to weld the entire length of seam very expeditiously and with economy of gases.

This is accomplished by guiding the wire through the tip block, or among the jets, in a downward and rearward direction, and most advantageously by delivering the wire at a very acute angle to the face of the tip. The multiple jet tip block herein illustrated is therefore drilled with a wire channel which ranges more lengthwise than downward from its forward upper portion to a rearward point in the lower jet-delivering face.

The end of the wire emerging in this manner is directed toward and is speedily melted into the accumulation of molten metal beneath the rearward portion of the tip block, and if not melted before it encounters relatively solid metal it is sufficiently plastic to be laid into the seam and melted in place. The welds obtained are smooth and well filled and show excellent interfusion of the original metal and the added metal.

The purpose of the invention can be promoted by cutting away the under part of the tip block so that the wire is exposed to radiant heat before it passes below the block. The rate at which the wire can be heated and melted can also be increased by providing the block with a recess where the wire leaves the guide channel and by directing one or more wire heating jets into this recess, these jets playing higher up than the other jets and serving to preheat the wire before it reaches the zone of fusion. This feature is not necessarily confined to any particular angle or direction of the wire channel.

Another object of the invention is to preheat the weld metal wire for a distance before it reaches the region of intense heating by means of heat conveyed by the envelope gases. For this purpose the wire is passed through a flue which conducts these heated gases, chiefly hydrogen and carbon monoxide, away from the region where they are liberated. This may be accomplished by making the wire guide channel through the multiple tip block or structure sufficiently large to pass a substantial flow of the gases in a direction counter to the feed of the wire. An escape port is provided through which the gases thus conducted find an exit to the atmosphere without passing through the length of the guide tube leading from the feed mechanism to the tip device, thereby insuring the desired flow through the flue.

In the accompanying drawings forming part hereof:

Fig. 1 is a side elevation of a welder embodying the invention, showing a wire feeding device and indicating a support for the torch and the wire feeding device;

Fig. 2 is a side elevation of the multiple jet, wire feed tip block, with a portion broken away and in section, this view illustrating the making of a reinforced weld with the aid of the weld metal wire;

Fig. 3 is a bottom plan view of this tip block; and

Fig. 4 is a cross-section on the line 4—4 of Fig. 2.

The drawings illustrate an oxyacetylene torch 2 mounted on a bracket 3 having means for adjusting the torch to a definite desired position in which it is firmly supported. The numerals 4 and 5 designate the oxygen and acetylene connections to the torch, and it will be understood that the torch is suitably designed to mix these gases and to deliver the mixture to the tip block 6.

The mixture enters the tip block, preferably at the rear end, through a supply passage 7, and is supplied to two longitudinal, spaced manifold chambers 8. Other passages 9 in the block serve for the circulation of water for cooling, as is customary.

The tip block is set at an angle to the shank of the torch and is much elongated so as to extend lengthwise of the seam to be welded.

The level of the plate or sheet metal to be united is indicated at 10. The edges may be simply in abutting relation, or they may be beveled in accordance with familiar practice so as to form a fairly broad V groove. For the purpose of this invention, the latter will usually be the case. It will be understood that means are provided for supporting the work and that either the torch or the work is driven by mechanical means at uniform speed which is adjusted to the requirements of the particular operation. The upper arrow indicates the direction of movement if it is the torch which is moved, and correspondingly the lower arrow indicates the direction of movement of the work if that is moved.

Numerous small jet passages 11 are drilled from the lower face of the tip to the manifold chambers 8. The orifices of these passages may be arranged in generally parallel lines, and the whole assemblage of flame jets which are delivered forms a long zone of heating. The jets are also spaced or spread in the transverse direction so that maximum heating efficiency is secured.

As the seam passes beneath the jets, or, viceversa, as the jets travel lengthwise of the seam, the metal of the seam edges, or the sides of the groove, are progressively heated until at about the mid-region of the length of the lane of flame, or somewhat rearwardly of that, the metal is brought to fusion.

It is beneficial to space the forward preheating jets comparatively widely in the transverse direction and to bring succeeding lines or groups of jets nearer to the central longitudinal plane. This may be accomplished by converging the lines of jets from front to rear, or, as illustrated, by having the forward rows parallel and rather widely spaced, and succeeding rows more narrowly spaced.

Metal is to be added to the weld in the process of making it, and such added metal may supply the major part of the completed weld, or it may constitute a lesser part, The weld metal wire is designated 12, and it is fed from a supply by a suitable motor-driven feed device 13, which may be mounted with the torch or on another support. If it is the torch that is driven lengthwise of the seam, the torch and the feed mechanism are of course supported by the driven carriage. The wire is guided from the feed device to the tip block through a flexible tube 14, which is secured to the block at 15.

Means are provided for guiding the wire through the tip block structure, this means being preferably, as heretofore, a channel 16 drilled through the block, but in accordance with this invention the channel through which the wire is conducted to the lower jet-delivering face extends at an inclination which ranges downwardly and rearwardly. The exit end 17 of this channel is among the rearward jets, some distance in front of the rear end of the jet arrangement, and the other end is well forward. I find that an angle of about 15° between the wire channel and the face of the block is very advantageous but it is to be understood that this is given by way of illustration. Delivering the wire end in a downward and rearward direction permits of far greater linear speeds of welding than were attainable with my prior wire-feed torches. A comparatively low angle of emergence of the wire enables a substantial length of it to be disposed in the highly heated region between the tip block and the bottom of the seam. I do not necessarily limit myself to the particular nature of the means for guiding the wire to its point of emergence at the bottom of the multiple jet structure, as long as it is arranged to deliver the wire in a rearward direction at or adjacent the region where it is incorporated in the welded seam.

The wire rendered plastic by the intense heat will bend before it melts. An effective method is to feed the wire at such a rate that it is continually laid unmelted, or partially melted, into or onto the fused metal already present, the melting of the wire thus laid and its incorporation with the original molten material being completed by the jets behind the exit 17.

For certain operations, on the contrary, it is desirable to add the metal in the form of a molten stream or succession of drops, which can be accomplished by utilizing sufficient heat with relation to the rate at which the wire is fed.

Because of the rearward direction or inclination in which the wire or rod is conducted, its end is presented, not to the region where the jets are excavating the parent metal so that the weld will have thorough penetration, but to the rearward region where the molten metal is banking up to form the weld.

In any case the present improvement allows of feeding a large quantity of wire per unit of time, at rates as great as sixty inches a minute, for example, or greater, and thereby makes it possible to advance the weld at greatly increased speed while insuring the presence of any desired amount of metal in each cross-section of the weld.

The speed at which the wire can be fed and its metal incorporated in the weld can also be materially increased by utilizing one or more of the following features, the embodiments of which are illustrative since they may be realized in various ways.

Thus, the region of the lower portion of the block where the wire comes out is shown cut away to form a recess 18, and one or more heating jet passages 19 are shown drilled in approximately the vertical plane of the wire channel to deliver their jets within this recess, so that these jets will act upon the wire and heat it strongly before it enters the region of fusion. The particular arrangement of these wire preheating jets may be varied. They may be sufficient to melt the wire or to initiate the melting, or they may merely put sufficient heat into the wire so that it melts in the space between the tip block and the material to be united, or they may contribute to the making of the wire plastic in those cases in which it is laid into the weld to be fused more or less in place.

One or more other recesses 20 cut into the lower portion of the block expose the wire to the intense radiant heat existing between the tip block and the seam, before the wire passes from the tip. The recess 18 also contributes to this effect. The advantages of preliminarily exposing the wire to intense radiant heat are similar to those just explained in connection with the wire preheating jets. Either or both of these features may be employed with advantage.

Another important feature involves the plan of causing heated envelope gases to flow around the wire for a substantial distance as the wire moves toward the welding zone. This may be accomplished in various ways. In the illustrated embodiment the channel 16 is made considerably larger than the wire to be guided, and an escape port 21 is formed in the block at the upper end of this channel adjacent the end of the tube 14, though it may be located elsewhere. The gases issuing from this port may be ignited and burn harmlessly as a low temperature flame. Without such a port the gases would have to endeavor to flow through the entire length of the tube 14, which they would scarcely do, at least in sufficient volume to be of any effect, because of the frictional resistance and the movement of the wire opposing their flow. The preheating of the wire produced by these gases contributes very materially in making possible increased rates of wire feed.

While certain embodiments of the invention have been described in detail, it is to be understood that the form of execution may be varied.

I claim:

1. A fusion welder constructed to deliver a seamwise-extended arrangement of heating and welding jets and having a channel through which a weld metal wire passes into position to be fused into the seam by the heat of the rearward jets, said channel extending in a downward and rearward direction to an exit among the rearward jets.

2. A fusion welder having an elongated tip block constructed to deliver a seamwise extended arrangement of heating and welding jets, said block having a wire channel so disposed as to deliver the weld metal wire in a substantially rearward direction to the region where the molten metal banks up to form the weld.

3. A fusion welder having an elongated tip block constructed to deliver a seamwise extended arrangement of heating and welding jets, said block having a wire channel pasisng through it from a forward to a rearward region at a very acute angle to the face of the block and terminating in an exit intermediate the ends of the jet arrangement.

4. In welding apparatus, the combination of means for forming and delivering a seamwise extended arrangement of heating and welding jets, means for feeding a weld metal wire, and downwardly and rearwardly extending guide means for delivering said wire among the rearward jets in the region where the molten metal banks up to form the weld.

5. A fusion welder having an elongated tip block constructed to deliver seamwise extended lines of heating and welding jets and having a wire channel passing between the jets, the under part of said block being recessed at the region where the wire is exposed and having a wire-heating jet passage opening into such recess.

6. A fusion welder comprising an elongated tip structure constructed to deliver a laterally spaced and seamwise extended arrangement of heating and welding jets, means for conducting a weld metal wire in a substantially rearward direction to the under side of said tip structure to the region of the welding jets, and means for delivering one or more special wire heating jets from orifices higher up than the orifices of the other jets so as to heat the rod at a region in front of the point where it enters the molten puddle.

7. A multiple jet welding tip having means for delivering a seamwise extended arrangement of heating and welding jets, means for conducting a weld metal wire, and means for delivering one or more jets higher up than other jets to act on the wire.

8. In a fusion welder, a multiple jet tip structure adapted to deliver a seamwise extended arrangement of heating and welding jets, and means for conducting a weld metal wire through the structure, said structure being provided with a recess extending upwardly therein through which the wire passes and wherein it is exposed to intense radiant heat.

9. A fusion welder having an elongated tip block constructed to deliver seamwise extended lines of heating and welding jets and having a wire channel passing between the jets in a downward and rearward direction, the under part of said block being formed with a cavity which exposes the wire to radiant heat.

10. A multiple jet machine welding tip provided with a plurality of lines of seamwise extended heating and welding jet passages and with a flue between said passages for conducting heating envelope gases, and means for guiding a weld metal wire through said flue.

11. In a fusion welder, the combination of a multiple jet machine welding tip provided with a channel through it adapted to conduct a flow of heated envelope gases, and a tube for connecting a weld metal wire to said channel, there being an escape port for the gases to issue to the atmosphere after passing through said channel and without passing through the length of said tube.

12. Improvement in the art of welding seams by means of a seamwise extended arrangement of heating and welding jets, while causing relative longitudinal travel between the jets and the seam, and feeding a wire to be melted into the seam by the heat of the jets, said improvement consisting in delivering the wire in a substantially rearward direction to the region where it is melted.

13. Improvement in the art of welding seams by means of a seamwise extended arrangement of heating and welding jets, while causing relative longitudinal travel between the jets and the seam, and feeding a wire to be melted into the seam by the heat of the jets, said improvement consisting in laying the wire in a rearward direction into the seam at the region where the metal is in fusion and fusing it as it is laid.

14. A fusion welder having means for forming and delivering a seamwise extended arrangement of heating and welding jets, said welder having a guide for conducting a weld metal wire in a general rearward direction with respect to the collection of jets so that its metal is fused and enters the weld toward the rear end of the welder, and being further provided with jets disposed to heat the wire before it passes below the bottom of the welder.

JAMES L. ANDERSON.